United States Patent

Kawachiya et al.

(10) Patent No.: US 11,314,640 B2
(45) Date of Patent: Apr. 26, 2022

(54) METHOD, PROGRAM, AND SYSTEM FOR REDUCING THE COST OF STACK SCANNING

(71) Applicant: INTERNATIONAL BUSINESS MACHINES CORPORATION, Armonk, NY (US)

(72) Inventors: Kiyokuni Kawachiya, Kanagawa (JP); Tamiya Onodera, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1010 days.

(21) Appl. No.: 14/567,526

(22) Filed: Dec. 11, 2014

(65) Prior Publication Data
US 2015/0169444 A1    Jun. 18, 2015

(30) Foreign Application Priority Data
Dec. 13, 2013   (JP) .............................. JP2013-257970

(51) Int. Cl.
     *G06F 16/00*      (2019.01)
     *G06F 12/02*      (2006.01)

(52) U.S. Cl.
CPC ...... *G06F 12/0261* (2013.01); *G06F 12/0276* (2013.01); *G06F 2212/1024* (2013.01); *G06F 2212/702* (2013.01)

(58) Field of Classification Search
CPC ..... H04L 67/00; G06F 17/00; G06F 12/0261; G06F 12/0276; G06F 2212/1024; G06F 2212/702
See application file for complete search history.

(56) References Cited

U.S. PATENT DOCUMENTS 6,763,440 B1 * 7/2004 Traversat ............ G06F 12/0276
                                                                   707/999.202
6,865,657 B1 * 3/2005 Traversat ............ G06F 12/0276
                                                                   707/999.202
(Continued)

FOREIGN PATENT DOCUMENTS

JP      11-312117 A      11/1999
JP      2004-078750 A      3/2004
(Continued)

OTHER PUBLICATIONS

Cheng, et al., "Generational Stack Collection and Profile-Driven Pretenuring," Proceedings of the ACM SIGPLAN 1998 conference on Programming language design and implementation, Jun. 1998. (pp. 162-173).

*Primary Examiner* — Anhtai V Tran
(74) *Attorney, Agent, or Firm* — Tutunjian & Bitetto, PC; Joseph Petrokaitis

(57) ABSTRACT

A method for reducing the cost of stack scanning in garbage collection (GC) includes, in the GC of the first-generation heap area, registering, in a nursery object reference list prepared for each thread, one or more addresses, within each stack, which each refer to a nursery object, and updating a scanning unnecessary area starting pointer such that the addresses listed in the nursery object reference list are included in the area from the bottom of the stack to the address pointed to by the scanning unnecessary area starting pointer. The method further includes, in the next GC of the first-generation heap area, for the area from the bottom of the stack to the address pointed to by the scanning unnecessary area starting pointer, performing the GC processing on the addresses included in the nursery object reference list.

10 Claims, 5 Drawing Sheets

(56) References Cited

U.S. PATENT DOCUMENTS

| | | | |
|---|---|---|---|
| 6,912,554 B2 * | 6/2005 | Yuasa | G06F 12/0269 |
| 2006/0173897 A1 * | 8/2006 | Lee | G06F 12/0253 |
| 2007/0100919 A1 | 5/2007 | Lee et al. | |
| 2008/0021939 A1 * | 1/2008 | Dahlstedt | G06F 9/52 |
| 2009/0112953 A1 * | 4/2009 | Barsness | G06F 12/0269 |
| 2009/0119352 A1 * | 5/2009 | Branda | G06F 12/0276 |
| 2010/0114998 A1 * | 5/2010 | Steensgaard | G06F 12/0269 707/813 |
| 2013/0318132 A1 * | 11/2013 | Basu | G06F 12/0276 707/816 |
| 2014/0033213 A1 * | 1/2014 | Hudson | G06F 9/54 718/102 |

FOREIGN PATENT DOCUMENTS

| | | |
|---|---|---|
| JP | 2004-246753 A | 9/2004 |
| JP | 2004-295889 A | 10/2004 |
| JP | 2010015223 A | 1/2010 |
| JP | 2011175333 A | 9/2011 |
| JP | 2013041482 A | 2/2013 |
| JP | 2013-105256 A | 5/2013 |

* cited by examiner

METHOD, PROGRAM, AND SYSTEM FOR REDUCING THE COST OF STACK SCANNING

BACKGROUND

Technical Field

The present invention relates to a technique for reducing the cost of stack scanning in garbage collection (GC) in a computer. More particularly, the present invention relates to a technique for reducing the stack scanning cost in the GC by reusing the previous GC results.

Description of the Related Art

In a recent Java® processing system, generational GC is used to reduce the pause time by the GC, because the GC cost considerably affects the performance of Java® applications. In generational GC, the heap area is split into two areas: a first-generation (nursery) heap area where new objects are allocated, and a second-generation (tenured) heap area where objects that have survived a plurality of times of GC in the first-generation heap area are moved. Usually, only the GC of the first-generation heap area is performed. The GC of the entire heap area is performed only when it has become difficult to prepare sufficient free space. This process reduces the overall GC time.

The GC of the first-generation heap area described above can be performed quickly, as it only checks whether each of the objects present in the area is alive or not. In order to check for the live objects without fail, however, scanning the area, called the "GC root", is mandatory. The GC roots include static variables, various tables, a "remember set" indicating references from the second-generation heap area, and stack frames of threads.

In a recent large-scale application, the number of stack frames tends to become large, and a large number of threads tend to be generated. The reason this occurs is that recent large-scale applications are often established on various frameworks (e.g., WAS, ICA, IOC, etc.) on Java®, and it has become common to implement other language processing systems (e.g., JRuby, Jython, P8, etc.) on the Java® virtual machine (VM). Accordingly, in a large-scale application, the stack scanning takes a longer time, and the stack scanning cost has become a major factor of overhead for the GC of the first-generation heap area.

Conventional techniques aimed at reducing the GC cost include Patent Literature 1 to 3. Patent Literature 1 discloses the following technique: an object, created by an application program, is created in a thread local heap correlated with one thread, and, in response to a change of the thread which can refer to the created object, the object is moved to an appropriate thread group heap. At the time of collection of an object that has become unnecessary, only the thread that can refer to the unnecessary object is stopped.

Patent Literature 2 discloses the following technique: at the start of an application program, a run-time library is called to analyze the application program to determine whether objects generated are used only inside a method or not. Any object used only inside the method is generated on a frame of a stack area, and the other objects are generated on a heap area.

Patent Literature 3 discloses a memory management device which includes: a garbage collection execution unit; a garbage collection recording unit which records, each time the garbage collection is executed, the number of times of garbage collection and the memory volume after the execution of the garbage collection; an extended memory volume conversion unit which determines, on the basis of the records by the garbage collection recording unit, a memory chart for determining the volume of an extended memory when memory extension is required by the execution of the garbage collection; an extended memory volume storing unit which stores the extended memory volume determined by the extended memory volume conversion unit; and a memory extending unit which refers to the extended memory volume storing unit when memory extension is required for the execution of a program and determines the extended memory volume on the basis of the memory extension chart.

While Patent Literatures 1 to 3 disclose the techniques for reducing the number of times of GC or the execution pause time by the GC, none of these techniques can be applied to the reduction of the time taken by the stack scanning in GC.

Non-Patent Literature 1 discloses the following technique: for a program with a deep stack, the stack scanning cost becomes high. Therefore, for the unchanged stack area, scanning is not repeated, but the results of the previous GC are reused (see Section 5. Generational Stack Collection).

The technique of Non-Patent Literature 1, however, is aimed at early and simple generational GC in which live objects in the first-generation heap area are moved to the second-generation heap area without exception in next GC. This technique does not take into consideration the situation where the stack area, once scanned, still includes a reference to an object residing in the first-generation heap area (hereinafter, such an object will also be called a "nursery object"). Therefore, it is not possible to apply the technique of Non-Patent Literature 1, as it is, to modern generational GC in which an object that has survived a plurality of times of GC in the first-generation heap area is moved to the second-generation heap area.

(Patent Literature 1) Japanese Patent Application Publication No. 2004-246753.

(Patent Literature 2) Japanese Patent Application Publication No. 2004-78750.

(Patent Literature 3) Japanese Patent Application Publication No. 11-312117.

(Non-Patent Literature 1) Perry Cheng, Robert Harper, Peter Lee, "Generational Stack Collection and Profile-Driven Pretenuring", Proceedings of the ACM SIGPLAN 1998 conference on Programming language design and implementation, pp. 162-173, Jun. 17-19, 1998, Montreal, Quebec, Canada.

SUMMARY

In view of the foregoing, the present invention provides a technique which can reduce the time taken by stack scanning in GC, including modern generational GC.

In order to achieve the above objective, according to one embodiment of the present invention, the following method for reducing the cost of stack scanning is provided, which may be implemented by a computer system supporting generational GC. The method for reducing the cost of stack scanning includes the steps of: preparing, for each thread, a scanning unnecessary area starting pointer pointing to inside a stack of the thread; in GC of a first-generation (nursery) heap area, setting a value for the scanning unnecessary area starting pointer for each thread such that an area from a bottom of the stack to an address pointed to by the scanning unnecessary area starting pointer becomes an area which includes no reference to a nursery object residing in the first-generation heap area; and in next GC of the first-generation heap area, performing stack scanning, for each thread, on only stack frames located above (in other words, located on the top side of the stack with respect to) a stack frame pointed to by the scanning unnecessary area starting pointer.

Preferably, the method further includes the steps of: in the GC of the first-generation heap area, registering, in a nursery object reference list prepared for each thread, one or more addresses within the corresponding stack which each refer to or may refer to the nursery object; and updating the scanning unnecessary area starting pointer such that the addresses listed in the nursery object reference list are included in the area from the bottom of the stack to the address pointed to by the scanning unnecessary area starting pointer; wherein in the next GC of the first-generation heap area, for the area from the bottom of the stack to the address pointed to by the scanning unnecessary area starting pointer, GC processing is performed only on the addresses included in the nursery object reference list.

More preferably, the method further includes the step of, in the next GC of the first-generation heap area, prior to performing the stack scanning for each thread, determining, for each address included in the nursery object reference list, whether the address is included in a stack frame located above (in other words, located on the top side of the stack with respect to) the stack frame pointed to by the scanning unnecessary area starting pointer, and deleting the address from the nursery object reference list on the condition that the address is included in the stack frame located above the stack frame pointed to by the scanning unnecessary area starting pointer.

Preferably, the GC processing performed on the addresses listed in the nursery object reference list includes, for each address, in response to movement of an object that is accessed by a reference stored in the address, updating the reference stored in the address such that the reference properly points to the moved object.

More preferably, the GC processing performed on the addresses listed in the nursery object reference list includes, for each address included in the nursery object reference list, deleting the address from the nursery object reference list on the condition that an object that is referenced from the address is moved to a second-generation (tenured) heap area.

Preferably, the method further includes the step of, in response to discarding of at least one of stack frames, determining whether the scanning unnecessary area starting pointer is pointing to the stack frame being discarded and, on the condition that the pointer is pointing to the stack frame being discarded, performing adjustment processing of setting, for the scanning unnecessary area starting pointer, a value of a new stack pointer after the discarding of the stack frame.

More preferably, the method further includes the step of, in the next GC of the first-generation heap area, as preprocessing, shifting the scanning unnecessary area starting pointer downward so as to point to a first stack frame corresponding to a code including the adjustment processing.

More preferably, the method further includes the step of, in response to updating of the value of the scanning unnecessary area starting pointer, rewriting information about a return destination of a method, stored in the stack frame pointed to by the updated value, so that the adjustment processing is performed before a return to the return destination of the method is made.

Preferably, the method further includes the step of, in the case where there is an object placed in a stack for each thread, adding an address of a reference field within the object to the corresponding nursery object reference list.

Preferably, the method further includes the step of setting an upper limit of the scanning unnecessary area starting pointer to an address of a position a prescribed number of stack frames away from a top stack frame, and prohibiting registration, to the nursery object reference list, of an address of any data stacked above the set upper limit.

According to another embodiment of the present invention, the following method for reducing the cost of stack scanning is provided, which method is implemented by a computer system supporting GC. The method for reducing the cost of stack scanning includes the steps of: preparing, for each thread, a scanning unnecessary area starting pointer pointing to inside an execution stack of the thread, and an object reference list for registering one or more addresses, within the stack, which each refer to or may refer to an object; and in GC, registering, in the object reference list, one or more addresses within the stack which each refer to or may refer to an object, and setting the scanning unnecessary area starting pointer such that the addresses listed in the object reference list are included in an area from a bottom of the stack to an address pointed to by the scanning unnecessary area starting pointer, wherein in next GC and on, for the area from the bottom of the stack to the address pointed to by the scanning unnecessary area starting pointer, GC processing is performed only on the addresses included in the object reference list.

While the embodiments of the present invention have been described above as a method for reducing the cost of stack scanning, the present invention may also be understood as a program for reducing the cost of stack scanning, the program causing a computer to execute the steps of the method for reducing the cost of stack scanning described above. The present invention may also be understood as a computer system for reducing the cost of stack scanning, the system including units adapted to execute the steps of the method for reducing the cost of stack scanning described above.

According to one embodiment of the present invention, for each thread, a scanning unnecessary area starting pointer pointing to inside a stack for the thread is prepared, and a value is set for the scanning unnecessary area starting pointer for each thread such that the area from the bottom of the stack to the address pointed to by the scanning unnecessary area starting pointer becomes an area which includes no reference to an object residing in the heap area. Accordingly, in the next GC of the heap area, the stack scanning for each thread needs to be performed only on the stack frames located above the stack frame pointed to by the scanning unnecessary area starting pointer. This can reduce the time taken by the stack scanning in GC including modern generational GC.

Further, in the GC, one or more addresses within each stack, which each refer to or may refer to an object, are registered in an object reference list prepared for each thread, and the scanning unnecessary area starting pointer is updated such that any address listed in the object reference list is included in the area from the bottom of the stack to the address pointed to by the scanning unnecessary area starting pointer. Accordingly, in the next GC of the heap area, for the area from the bottom of the stack to the address pointed to by the scanning unnecessary area starting pointer, the GC processing needs to be performed only on the addresses included in the object reference list. This can further reduce the time taken by the stack scanning in GC including modern generational GC. The other effects of the present invention will be understood from the description of the embodiment below.

DETAILED DESCRIPTION OF THE PREFERRED EMBODIMENTS

An embodiment of the present invention will be described below in detail with reference to the drawings. The following embodiment, however, does not restrict the claimed invention, and all the combinations of the features discussed in the embodiment are not necessarily indispensable for the solving means of the invention. Throughout the description of the embodiments of the present invention, the same elements are denoted by the same numerals.

Figure 1:
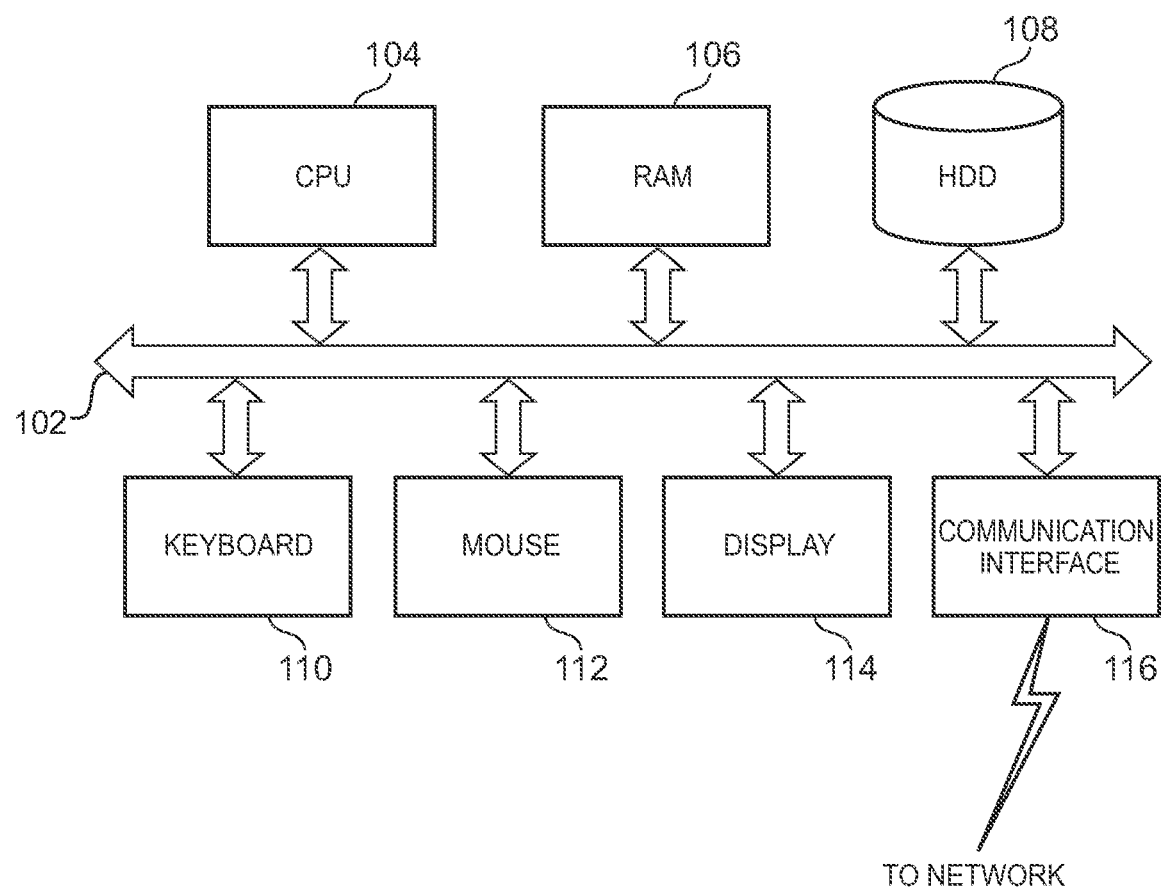
FIG. 1 shows an exemplary hardware configuration of a computer system suitable for carrying out one embodiment of the present invention.

Referring to FIG. 1, a block diagram of computer hardware for implementing the system configuration and processing according to one embodiment of the present invention is shown. In FIG. 1, a CPU 104, a main memory (RAM) 106, a hard disk drive (HDD) 108, a keyboard 110, a mouse 112, and a display 114 are connected to a system bus 102. The CPU 104 is suitably based on 32-bit or 64-bit architecture. For example, Intel Core™ i3, Core™ i5, Core™ i7, or Xeon®, or AMD Athlon™, Phenom™, or Sempron™ may be used. The main memory 106 has a capacity of suitably 8 GB or more, and more preferably 16 GB or more.

Figure 2:
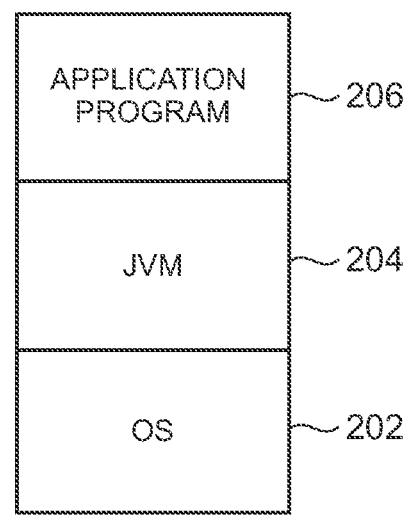
FIG. 2 shows the hierarchy of software for carrying out one embodiment of the present invention.

The hard disk drive 108 stores an operating system (OS) 202 (FIG. 2). The operating system 202 may be any system compatible with the CPU 104, such as Linux™, Microsoft Windows™ 7, Windows8™, or Windows™ 2003 server, or Apple Computer's Mac OS™.

The hard disk drive 108 also stores a program, such as Apache™, for causing the system to operate as a Web server. The program is loaded into the main memory 106 at the startup of the system.

The hard disk drive 108 further stores a Java® Runtime Environment program for implementing a Java® virtual machine (JVM) 204 (FIG. 2). The program is loaded into the main memory 106 at the startup of the system. The functions of the present invention are implemented in the JVM 204.

The hard disk drive 108 further stores the application program 206 (FIG. 2).

The keyboard 110 and the mouse 112 are used to operate graphic objects such as icons, task bars, and text boxes displayed on the display 114, in accordance with a graphic user interface provided by the operating system.

The display 114 is suitably a 32-bit true color LCD monitor with a resolution of at least 1024×768, although it is not limited thereto. The display 114 is used, for example, to display the results of operations performed by an application program executed on the JVM 204.

A communication interface 116 is connected to a network suitably using the Ethernet® protocol. The communication interface 116 receives processing requests from a client computer (not shown), or returns processing results to a client computer (not shown), by using functions provided by Apache™, in accordance with a communication protocol such as TCP/IP.

Referring now to FIG. 2, the hierarchy of software for carrying out one embodiment of the present invention is shown. The application program 206 is composed of Java® bytecode and operates on the JVM 204. The JVM 204 is a customized JVM that includes, as a part of the GC functions, the function for reducing the cost of stack scanning according to one embodiment of the present invention. The JVM 204 may also include a JIT compiler.

The JVM 204 prepares a heap area in the main memory 106 for the application program 206. During operation, the application program 206 acquires a memory area in the heap area and allocates a generated object to the memory area.

The JVM 204 preferably supports a generational heap area. The generational heap area includes at least one first-generation (nursery) heap area for allocating new objects, and at least one second-generation (tenured) heap area. When it is no longer possible to allocate an object to the first-generation heap area, the JVM 204 performs GC on the first-generation heap area, and moves any object that has survived a plurality of times of GC in the first-generation heap area, from the first-generation heap area to the second-generation heap area. As a result, those objects which have survived for a while gather into the second-generation heap area. When the second-generation heap area becomes full, the JVM 204 performs GC on the entire heap area.

The JVM 204 may support a non-generational heap area. In the non-generational heap area, all heap areas are treated as the second-generation heap areas. The present invention is applicable to both the generational heap area and non-generational heap area. In the following description, it is assumed that the JVM 204 supports generational GC. For a JVM 204 supporting non-generational GC, the present invention may be applied to the GC of the entire heap area. The present invention is applicable to generational GC and non-generational GC in similar manner.

As explained above, in a recent Java® application, a thread stack tends to become deep. In the lower part of a stack, however, frames, including initialization code of a language processing system and various frameworks, are stacked. Actual processing is often carried out by using only the upper part of the stack, while the lower part remains unchanged. Using these characteristics, the results of scanning in a previous GC cycle are used for the unchanged part of the stack, to thereby lower the cost of the scanning processing. It is assumed that entries are stored bottom up in the stack, although the present invention is applicable to cases where entries are stored top down in the stack, or where entries are stored in a plurality of memory areas.

An important issue when reusing scanning results is how to treat a reference to a nursery object in the first-generation heap area, where the reference is included in the unchanged part of the stack. In modern generational GC, the objects in the first-generation heap area which have survived a plurality of times of GC are moved to the second-generation heap area. Therefore, if the scanned stack area includes a reference to a nursery object, it is necessary to monitor the nursery object until it is moved to the second-generation heap area.

In view of the foregoing, the JVM 204 newly introduces, for each thread managed, a scanning unnecessary area starting pointer and a nursery object reference list. The scanning unnecessary area starting pointer for each thread points to inside the stack allocated to the thread, to show the area in which it is unnecessary to perform conventional stack scanning in the GC of the first-generation heap area. The nursery object reference list for each thread lists, for the stack allocated to the thread, addresses where a reference to a nursery object is stored.

In performing the stack scanning in the GC of the first-generation heap area, the JVM 204 sets a value for the scanning unnecessary area starting pointer for each thread, such that the area from the bottom of the stack to the address pointed to by the scanning unnecessary area starting pointer becomes an area which includes no reference to a nursery object. Then, in next GC of the first-generation heap area, the JVM 204 carries out the stack scanning for each thread, limited to the stack frames located above the stack frame pointed to by the scanning unnecessary area starting pointer.

In place of, or in addition to, the above, in performing the stack scanning in the GC of the first-generation heap area, the JVM 204 may register any address within the stack that refers to, or may refer to, a nursery object, to the nursery object reference list. Further, the JVM 204 may update the scanning unnecessary area starting pointer so that the address(es) listed in the nursery object reference list is/are included in the area from the bottom of the stack to the address pointed to by the scanning unnecessary area starting pointer. Then, in next GC of the first-generation heap area, the JVM 204 may omit the stack scanning for the area from the bottom of the stack to the address pointed to by the scanning unnecessary area starting pointer. Rather, the JVM 204 may perform the GC processing on the address(es) included in the nursery object reference list.

Figure 3:
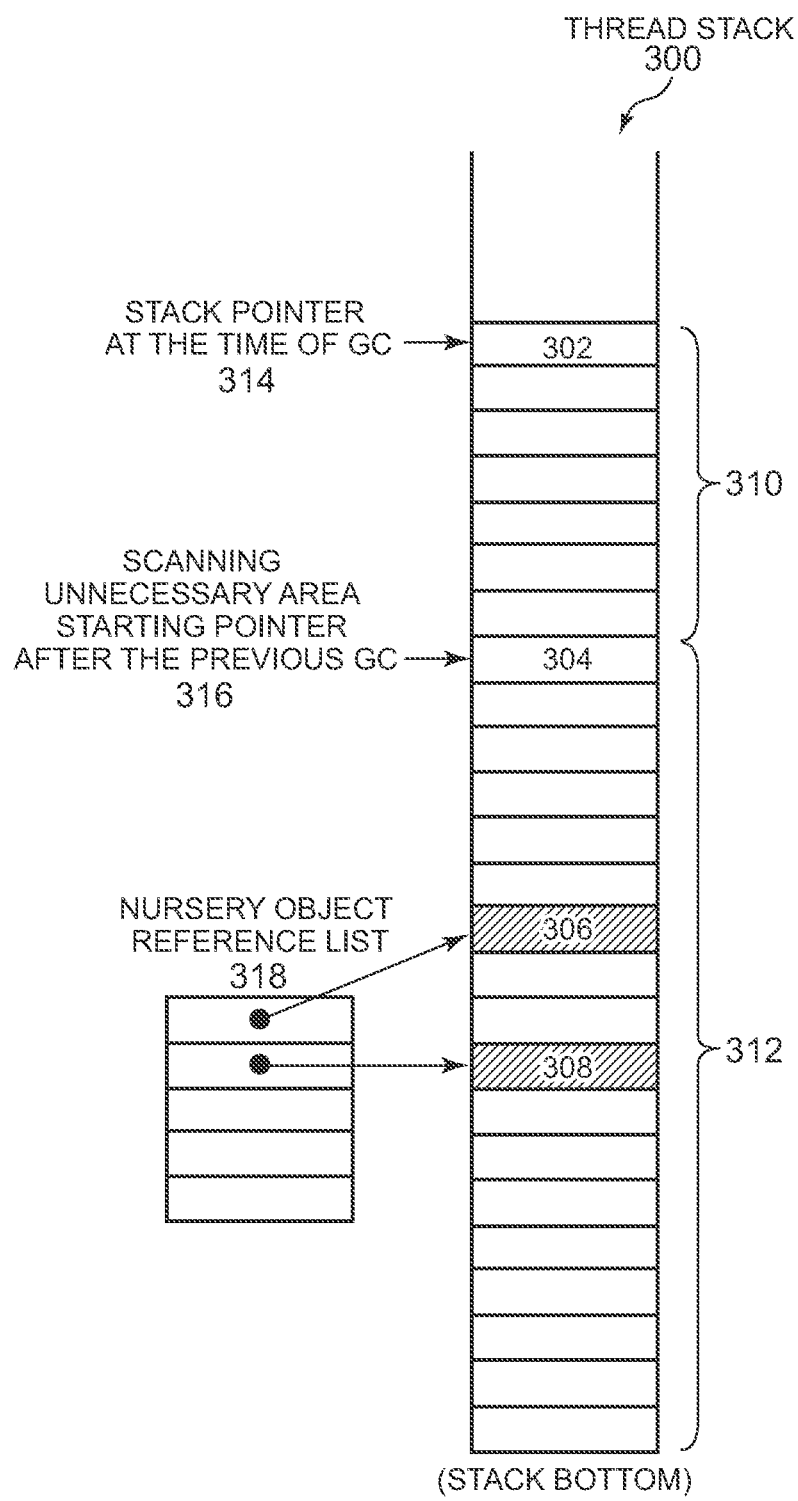
FIG. 3 illustrates information indicated by a scanning unnecessary area starting pointer and information included in a nursery object reference list.

Referring to FIG. 3, a scanning unnecessary area starting pointer 316, and a nursery object reference list 318 in the alternative example described above, are shown together with a thread stack 300. The stack entries are stored bottom up, and a stack pointer 314 at the time of GC processing of the first-generation heap area points to the stack frame at the top.

The nursery object reference list 318 includes the addresses of stack areas 306 and 308, each storing a reference to a nursery object, which have been found in the previous GC of the first-generation heap area. The scanning unnecessary area starting pointer 316 has its value set such that the addresses listed in the nursery object reference list are included in the area from the bottom of the stack to the address pointed to by the scanning unnecessary area starting pointer. More specifically, for the value of the scanning unnecessary area starting pointer 316, the lower limit of the stack pointer (meaning that the stack frames therebelow are unchanged) after the previous GC processing is set.

In the GC processing of the first-generation heap area, the JVM 204 performs stack scanning on only an area 310 of the stack frames located above the stack frame pointed to by the scanning unnecessary area starting pointer 316. For an area 312, from the bottom of the stack to the address pointed to by the scanning unnecessary area starting pointer 316, the JVM 204 does not perform stack scanning. Instead, the JVM 204 performs the GC processing only on the addresses included in the nursery object reference list 318. This can further reduce the time taken by the stack scanning in GC including modern generational GC.

Methods of managing and utilizing the newly introduced scanning unnecessary area starting pointer 316 and nursery object reference list 318 for each thread will be described below in detail, taking as an example the case of using the nursery object reference list 318 from the beginning.

1. Additional Processing when a Thread is Generated 1.1 The scanning unnecessary area starting pointer 316 is set to point to the bottom of a stack allocated to the thread.

1.2 An empty list is generated as the nursery object reference list 318.

2. Additional Processing When a Thread Dies

The scanning unnecessary area starting pointer 316 and the nursery object reference list 318 are discarded.

3. Additional Processing When a Stack Frame is Created (Method Entry Points)

None

4. Additional Processing When a Stack Frame is Discarded (Method Exit Points)

It is determined whether the scanning unnecessary area starting pointer 316 points to the stack frame being discarded. On the condition that it points to the stack frame being discarded, the codes in all method exit points are rewritten so that adjustment processing of setting a new stack pointer value for the scanning unnecessary area starting pointer 316 is performed. In place of determining whether the scanning unnecessary area starting pointer 316 points to the stack frame being discarded, it may be configured to determine whether the stack frame, pointed to by a new stack pointer, is located below the stack frame pointed to by the scanning unnecessary area starting pointer 316. In this case, it may be configured to perform the adjustment processing of setting the new stack pointer value for the scanning unnecessary area starting pointer 316, on the condition that the stack frame pointed to by a new stack pointer is located below the stack frame pointed to by the scanning unnecessary area starting pointer 316.

5. Processing in GC of the First-Generation Heap Area 5.1 Scanning of GC roots excluding stacks, for example, static variables and various tables, is performed in a conventional manner.

5.2 For each address listed in the nursery object reference list 318 for each thread, the following processing is performed.

5.2.1 Prior to scanning of each thread stack 300, it is determined, for each address, whether the address is included in a stack frame located above the stack frame pointed to by the corresponding scanning unnecessary area starting pointer 316. On the condition that the address is included in the stack frame located above the stack frame pointed to by the corresponding scanning unnecessary area starting pointer 316, the address is deleted from the nursery object reference list 318. It should be noted that the stack area corresponding to the deleted address is subjected to normal scanning afterwards, because the area may have been changed.

5.2.2 For each address, the GC processing is performed on the object that is referenced from the address, or in other words, on the object that is accessed by the reference stored in the address. As the object is moved to a new area in the first-generation heap area or to the second-generation heap area, the reference stored in the address is updated to properly point to the moved object. In the case where the object had been moved before this processing, only the updating of the reference is performed.

5.2.3 After the scanning of each thread stack 300, for each address included in the corresponding nursery object reference list 318, the address is deleted from the nursery object reference list 318, on the condition that the object accessed by the reference stored in the address was moved to the second-generation heap area or the like and, thus, the nursery object will no longer be referenced from that address.

5.3 For the stack frames located above the stack frame pointed to by the scanning unnecessary area starting pointer 316 for each thread, the scanning and GC processing are performed in a conventional manner. At this time, any address within the stack that refers to, or may refer to, a nursery object, is registered in the corresponding nursery object reference list 318. That address within a stack which may refer to a nursery object will be described in detail later in Extension A in 7.

5.4 The scanning unnecessary area starting pointer 316 for each thread is updated such that the addresses listed in the corresponding nursery object reference list 318 are included in the area from the bottom of the stack to the address pointed to by the scanning unnecessary area starting pointer 316.

6. Processing in GC of the Second-Generation Heap Area
Processing is performed in a conventional manner.

7. Extensions
Various extensions are conceivable for the above-described examples.

In the case where an object is placed in a stack, the reference field in the object may be rewritten, even during the execution of the stack frames located above the stack frame in which the object is included. This problem can be addressed by configuring, such that the address of the reference field in any object placed in the stack is registered in the nursery object reference list 318 without exception (Extension A). It should be noted that the JVM 204 can determine, from method information, which kinds of data are stored in the stack frames. Therefore, not limited to the addresses of the reference fields in the objects placed in the stack, the JVM 204 may register, in the nursery object reference list 318, any address within the stack that may possibly refer to a nursery object in the future, even though it is not currently referring to a nursery object.

It is considered that the stack frames in the upper part of a stack are changed frequently. Thus, an upper limit may be set for the scanning unnecessary area starting point, and in the GC of the first-generation heap area, it is configured such that the scanning unnecessary area starting pointer 316 is updated only within the range not exceeding the upper limit (Extension B). Here, the upper limit of the scanning unnecessary area starting pointer 316 is preferably set to a position at a prescribed number of stack frames below the top stack frame. In the case where the address of the data stacked above the set upper limit is included in the nursery object reference list 318, the address is naturally deleted, or the addition of the address of such data to the nursery object reference list 318 is prohibited. This can reduce the list size.

As explained in Section 4 above, when a stack frame is discarded, the value of the scanning unnecessary area starting pointer 316 is checked and updated if necessary. By performing such processing, method exit points will incur overhead. Therefore, the adjustment processing explained in Section 4 above is performed at only some of the method exit points. In this case, the scanning unnecessary area starting pointer 316 may point to an inappropriate position in the stack. Thus when preprocessing occurs in the GC of the first-generation heap area, the scanning unnecessary area starting pointer 316 is shifted downward so as to point to the first stack frame corresponding to the method including the code for the above-described adjustment processing (Extension C).

Instead of the above processing, in response to updating of the value of the scanning unnecessary area starting pointer 316 explained above in Section 5.4, the information about the return destination of the method, stored in the stack frame pointed to by the updated value, may be rewritten, such that the adjustment processing described above in Section 4 is carried out before a return to the return destination of the method is made (Extension D). More specifically, while the return address of the method in each stack frame originally points to its caller, at the time of updating (shifting upward), the scanning unnecessary area starting pointer 316, as described above in Section 5.4, for any stack frame located from the position originally pointed to by the pointer to the position newly pointed to by the updated pointer, the return address of the method in that stack frame is corrected so that the adjustment processing explained in Section 4 is carried out. This corrected address points to the code which executes the process of performing the adjustment processing before jumping to the original return destination. The JVM 204 may implement this code by internally preparing it as runtime code. It should be noted that the original address pointing to the caller is stored and saved in the location prepared for each stack frame at the time of rewriting. With this configuration, the frequency of checking of the value of the scanning unnecessary area starting pointer 316 can be limited to the required minimum number.

Figure 4:
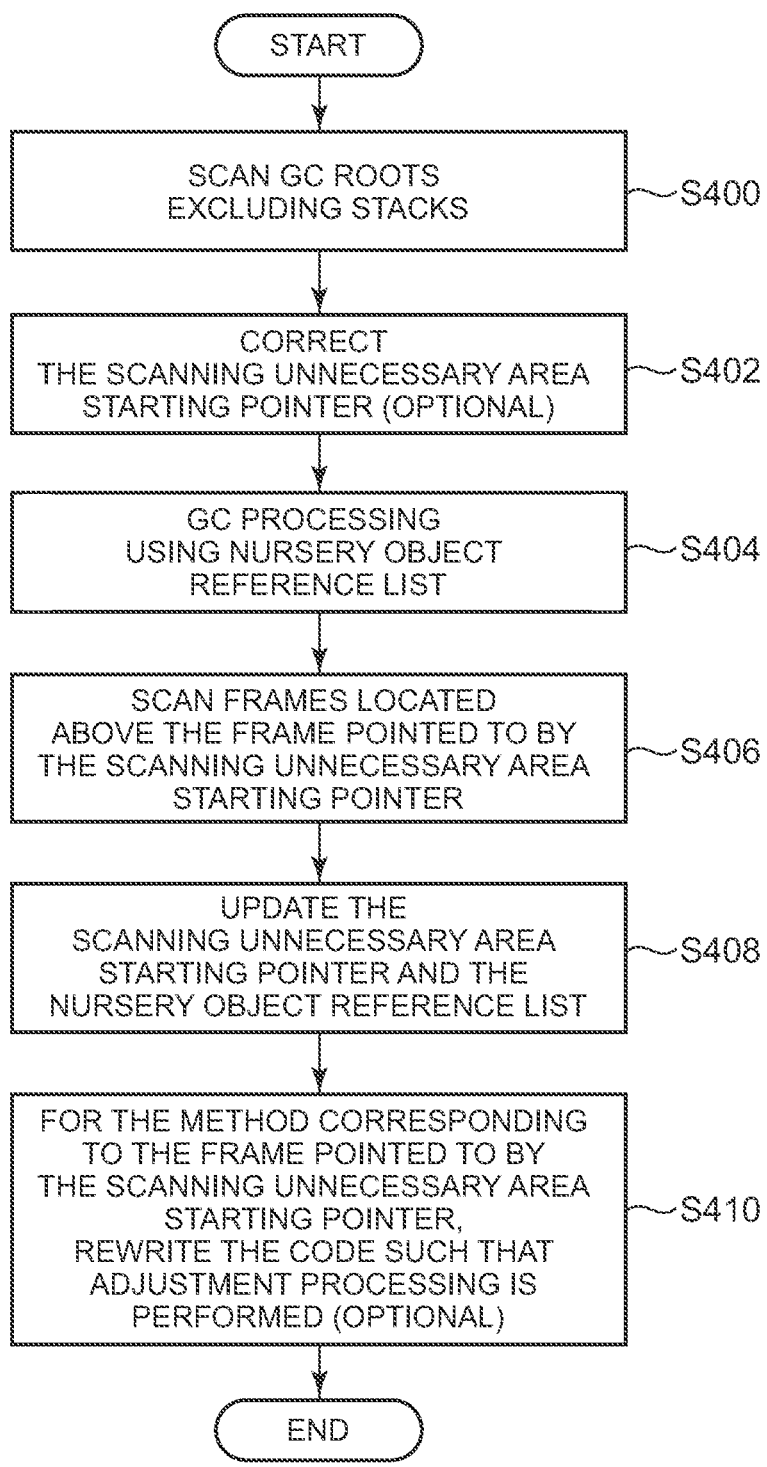
FIG. 4 shows an exemplary flowchart of GC processing of a first-generation heap area.
Figure 5:
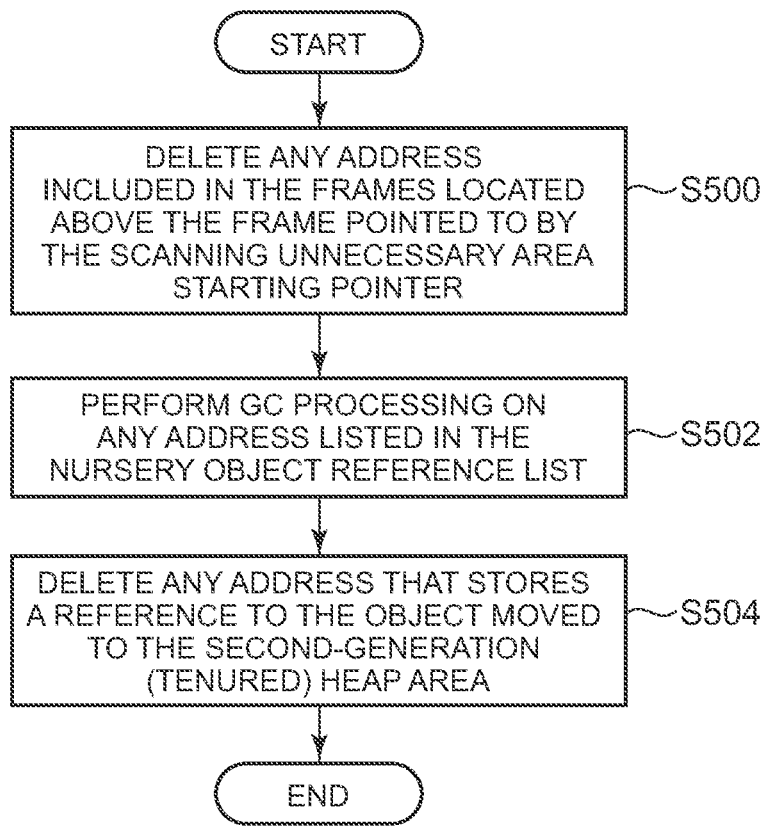
FIG. 5 shows an exemplary flowchart of GC processing using a nursery object reference list.
Figure 6:
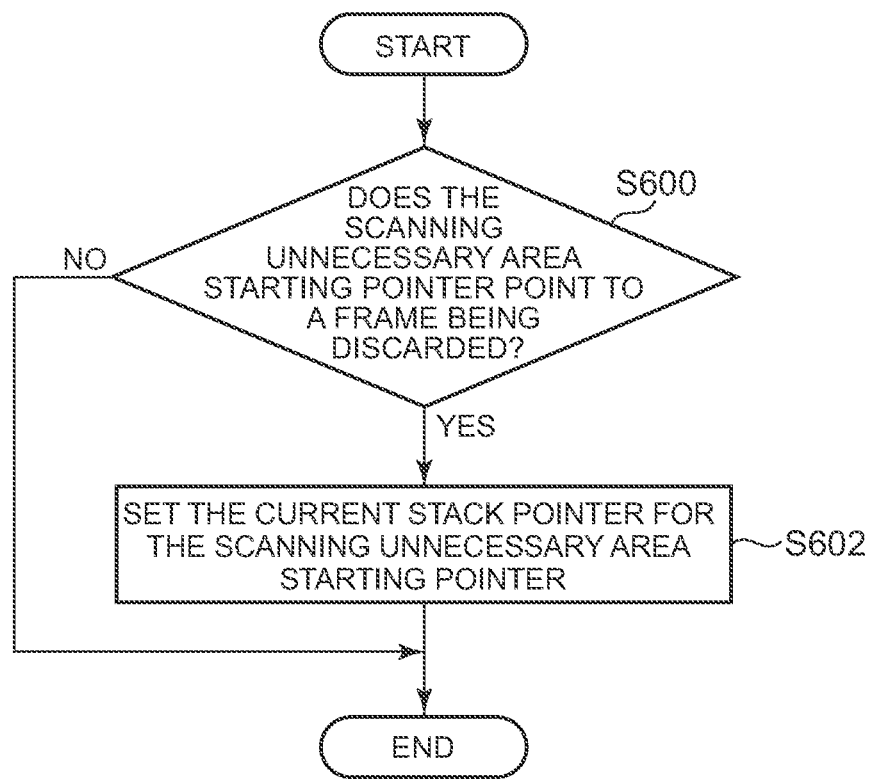
FIG. 6 shows an exemplary flowchart of processing executed in response to discarding of a stack frame.

The flow of processing for reducing the stack scanning cost, according to one embodiment of the present invention, will be described below with reference to FIGS. 4 to 6. FIG. 4 shows an exemplary flowchart of the GC processing of the first-generation heap area. FIG. 5 shows an exemplary flowchart of the GC processing using a nursery object reference list. FIG. 6 shows an exemplary flowchart of the processing which is performed in response to discarding of a stack frame.

The GC processing of the first-generation heap area shown in FIG. 4 starts at step 400, in which the JVM 204 performs scanning of GC roots excluding stacks. Next, the JVM 204 performs processing of correcting the scanning unnecessary area starting pointer (step 402). More specifically, the JVM 204 shifts the scanning unnecessary area starting pointer downward, so as to point to the first stack frame corresponding to the method including the code for the adjustment processing described in Section 4. It should be noted that the step 402 is optional.

Next, the JVM 204 performs the GC processing using a nursery object reference list (step 404). The details of the processing in step 404 will be described later with reference to FIG. 5. The JVM 204 then performs scanning of the stack frames located above the stack frame pointed to by the scanning unnecessary area starting pointer (step 406).

If an address, within the stack, storing a reference to a nursery object has been found as a result of the scanning in step 406, the JVM 204 adds the found address to the nursery object reference list (step 408). Further, the JVM 204 updates the scanning unnecessary area starting pointer, such that all the addresses listed in the nursery object reference list are included in the area from the bottom of the stack to the address pointed to by the scanning unnecessary area starting pointer (step 408).

In response to updating the value of the scanning unnecessary area starting pointer, for the method corresponding to the stack frame pointed to by the updated scanning unnecessary area starting pointer, the JVM 204 rewrites the code, or more specifically, the information about the return destination of the method stored in that stack frame, such that the adjustment processing described above in Section 4 is carried out in that return position (step 410). Further details of this step will be omitted because they have been described above in Extension D. It should be noted that the step 410 is optional. The processing is then terminated.

The GC processing, using a nursery object reference list shown in FIG. 5, starts at step 500, in which the JVM 204 checks the nursery object reference list and deletes any address included in the stack frames located above the stack frame pointed to by the scanning unnecessary area starting pointer.

Next, the JVM 204 reads addresses sequentially from the nursery object reference list, and performs the GC processing on the nursery objects which are accessed by the references stored in the stack areas corresponding to the addresses (step 502).

Next, for each address included in the nursery object reference list, the JVM 204 deletes the address from the nursery object reference list, on the condition that, as a result of the processing in step 502, the nursery object referenced from the address has been moved to the second-generation heap area or the like and, thus, the nursery object will no longer be referenced from the address (step 504). The processing is then terminated.

The processing shown in FIG. 6 is performed in response to discarding a stack frame. In step 600, the JVM 204 determines whether the scanning unnecessary area starting pointer points to the stack frame being discarded. If it is determined that the scanning unnecessary area starting pointer points to the stack frame being discarded (YES in step 600), the JVM 204 sets, for the scanning unnecessary area starting pointer, a new stack pointer value after the discarding of the stack frame (step 602). If it is determined in step 600 that the scanning unnecessary area starting pointer does not point to the stack frame being discarded (NO in step 600), or after the execution of the step 602, the processing is terminated.

While the present invention has been described above with reference to the embodiment, the technical scope of the present invention is not limited to that of the above-described embodiment. It is apparent to those skilled in the art that various modifications or improvements are possible for the above-described embodiment, and therefore, such modified or improved embodiments are naturally within the technical scope of the present invention.

It should be noted that the operations, procedures, steps, and stages of each process performed by an apparatus, system, program, and method shown in the claims, embodiment, or diagrams can be performed in any order, as long as the order is not indicated by "prior to", "before", or the like and as long as the output from a previous process is not used in a later process. It should also be noted that, even in the case where the output of a previous process is used in a later process, there may be another process between the previous and later processes, or even in the case where the description is made of the case where there is another process between the previous and later processes, the process order may be modified, such that the previous process is immediately followed by the later process. Even if the process flow is described using phrases such as "first", "next", "subsequently" or the like for convenience' sake in the claims, embodiment, or diagrams, it does not necessarily mean that the process must be performed in the described order.

The invention claimed is:

1. A non-transitory computer readable storage medium comprising a computer readable program for reducing a cost of stack scanning, wherein the program causes the computer to:

for each thread, prepare, using a hardware processor, a scanning unnecessary area starting pointer pointing to an address in a stack order of the thread;

in a generational garbage collection (GC) of a first-generation heap area, set a value of the scanning unnecessary area starting pointer for each thread where frame addresses below the value form a scanning unnecessary area, the scanning unnecessary area being a portion of the stack having frame addresses for which stack scanning is unnecessary for GC and that are free of reference to an object residing in the first-generation heap area, and frames of the stack with addresses above the value in the stack order form a scanning necessary area where stack scanning is performed for GC;

in a next GC of the first-generation heap area, perform stack scanning, for each thread, on only the scanning necessary area to produce stack scanning results for each frame of the scanning necessary area, and reuse previous stack scanning results from a previous GC for frames in the scanning unnecessary area; and perform GC of the first-generation heap area according to both the stack scanning results of the scanning necessary area and the previous stack scanning results of the scanning unnecessary area, wherein GC processing performed on the addresses listed in a nursery object reference list includes, for each address included in the nursery object reference list, deleting the address from the nursery object reference list on the condition that an object that is referenced from the address is moved to a second-generation heap area.

2. A computer system for reducing the cost of stack scanning, the system comprising units configured to:

for each thread, prepare, using a hardware processor, a scanning unnecessary area starting pointer pointing to an address in a stack order of the thread;

in a generational garbage collection (GC) of a first-generation heap area, set a value of the scanning unnecessary area starting pointer for each thread where frame addresses below the value form a scanning unnecessary area, the scanning unnecessary area being a portion of the stack having frame addresses for which stack scanning is unnecessary for GC and that are free of reference to an object residing in the first-generation heap area, and frames of the stack with addresses above the value in the stack order form a scanning necessary area where stack scanning is performed for GC;

in a next GC of the first-generation heap area, perform stack scanning, for each thread, on only the scanning necessary area to produce stack scanning results for each frame of the scanning necessary area, and reuse previous stack scanning results from a previous GC for frames in the scanning unnecessary area; and perform GC of the first-generation heap area according to both the stack scanning results of the scanning necessary area and the previous stack scanning results of the scanning unnecessary area, wherein GC processing performed on the addresses listed in a nursery object reference list includes, for each address included in the nursery object reference list, deleting the address from the nursery object reference list on the condition that an object that is referenced from the address is moved to a second-generation heap area.

3. The non-transitory computer readable storage medium according to claim 2, further comprising:
   in the GC of the first-generation heap area, registering, in a nursery object reference list prepared for each thread, one or more addresses within the corresponding stack which each refer to or may refer to the nursery object; and
   updating the scanning unnecessary area starting pointer such that the addresses listed in the nursery object reference list are included in the area from the bottom of the stack to the address pointed to by the scanning unnecessary area starting pointer; wherein
   in the next GC of the first-generation heap area, for the area from the bottom of the stack to the address pointed to by the scanning unnecessary area starting pointer, the GC processing is performed only on the addresses included in the nursery object reference list.

4. The non-transitory computer readable storage medium according to claim 3, further comprising, in response to discarding at least one of the stack frames, determining whether the scanning unnecessary area starting pointer is pointing to a stack frame being discarded and, on the condition that the scanning unnecessary area starting pointer is pointing to the stack frame being discarded, performing adjustment processing of setting a new stack pointer value for the scanning unnecessary area starting pointer.

5. The non-transitory computer readable storage medium according to claim 4, further comprising, in response to updating the new stack pointer value for the scanning unnecessary area starting pointer, rewriting information about a return destination of a method stored in the stack frame pointed to by the new stack pointer value, so that the adjustment processing is performed before a return to the return destination of the method is made.

6. The non-transitory computer readable storage medium according to claim 4, further comprising, in the next GC of the first-generation heap area, as preprocessing, shifting the scanning unnecessary area starting pointer downward so as to point to a first stack frame corresponding to a method including a code for the adjustment processing.

7. The non-transitory computer readable storage medium according to claim 4, further comprising, in the next GC of the first-generation heap area, prior to performing the stack scanning for each thread, determining, for each address included in the nursery object reference list, whether the address is included in a stack frame located above the stack frame pointed to by the scanning unnecessary area starting pointer, and deleting the address from the nursery object reference list on the condition that the address is included in the stack frame located above the stack frame pointed to by the scanning unnecessary area starting pointer.

8. The non-transitory computer readable storage medium according to claim 4, wherein the GC processing performed on the addresses listed in the nursery object reference list includes, for each address, in response to a moved object that is accessed by a reference stored in the address, updating the reference stored in the address such that the reference properly points to the moved object.

9. The non-transitory computer readable storage medium according to claim 4, further comprising, when an object is placed in a stack for each thread, adding an address of a reference field within the object to the corresponding nursery object reference list.

10. The non-transitory computer readable storage medium according to claim 4, further comprising setting an upper limit for the scanning unnecessary area starting pointer to an address of a position at a prescribed number of stack frames away from a top stack frame, and prohibiting registration, to the nursery object reference list, of an address of any data stacked above the upper limit.

* * * * *